United States Patent [19]

Misato et al.

[11] 3,899,585

[45] Aug. 12, 1975

[54] FUNGICIDAL METHOD FOR PROTECTING A PLANT

[75] Inventors: Tomomasa Misato, Tokyo; Keng Tang Huang, Wako; Yasuo Homma, Fukuoka; Ryonosuke Yoshida, Kamakura; Tadaomi Saito, Yokohama; Akira Shimizu, Kawasaki, all of Japan

[73] Assignee: Rikagaku Kenkyusho Ajinomoto Co. Ltd., Tokyo, Japan

[22] Filed: Mar. 27, 1974

[21] Appl. No.: 455,343

Related U.S. Application Data

[62] Division of Ser. No. 219,550, Jan. 20, 1972, Pat. No. 3,821,403.

[52] U.S. Cl. .................................. 424/274; 424/311
[51] Int. Cl. ......................... A01n 9/20; A01n 9/24
[58] Field of Search ........................... 424/224, 311

[56] References Cited

UNITED STATES PATENTS 3,433,779    3/1969    Vogler ............................ 424/311 X

FOREIGN PATENTS OR APPLICATIONS 961,304    6/1964    United Kingdom

*Primary Examiner*—Jerome D. Goldberg
*Assistant Examiner*—Allen J. Robinson
*Attorney, Agent, or Firm*—Sherman & Shalloway

[57] ABSTRACT

Amino acid higher alkyl esters, salts thereof and their N-lower alkyl derivatives are useful for controlling numerous plant diseases. They exhibit excellent protective effect rather than curative effect and have no phytotoxicity, extremely low mammalian toxicity and cause no risk of pollution toward soils.

8 Claims, No Drawings

FUNGICIDAL METHOD FOR PROTECTING A PLANT

This is a division of application Ser. No. 219,550, filed Jan. 20, 1972, now U.S. Pat. No. 3,821,403.

The present invention relates to an agricultural and horticultural fungicidal and bactericidal agent and to a method for the use thereof, and more particularly the present invention relates to fungicidal and bactericidal compositions for agricultural and horticultural use in which amino acid higher alkyl esters having 8 – 22 carbon atoms in its alkyl ester portion, salts thereof or their N-lower alkyl derivatives are the active ingredients.

Compounds of heavy metals such as copper, mercury and arsenic, as well as organophosphorus and organic chlorine compounds have been practically used for the control of plant diseases, but each of these fungicides cannot be necessarily said to be satisfactory one, because of its pollution toward soils, its strong medicinal harm on plants, its residual toxicity in food crops, its high mammalian toxicity or its irritiation to skin and eyes of humans.

As the result of having ardently studied compounds which do not possess any of the above faults as recognized in the fungicides hitherto used and which exhibit preventive effect against the fungal plant diseases, we have now found that amino acid higher alkyl esters, salts thereof and their N-lower alkyl derivatives exhibit excellent preventive effect against numerous plant diseases such as rice blast and rice leaf blight which are the main diseases of rice plant, citrus melanose, cucumber anthracnose, cucumber phytophthora rot, cucumber powdery mildew, cucumber downy mildew, tomato leaf mold, tomato late blight, tomato leaf spot and others, and that they have no phytotoxicity and have extremely low mammalian toxicity and cause no risk of pollution toward soils.

Amino acid higher alkyl esters, salts thereof or their N-substituted lower alkyl ester derivatives which are the active ingredients of the fungicidal composition in the present invention may be easily prepared by the known method per se. For example, amino acid or N-lower alkyl derivative thereof is mixed with higher alcohol under heating and dry hydrogen chloride gas is introduced into the mixture, whereby most of amino acid is dissolved and the corresponding amino acid ester hydrochloride is formed. On cooling, the solidified product is washed with ether or aromatic hydrocarbon such as benzene to remove unreacted higher alcohol. The crude amino acid ester hydrochloride obtained is recrystallized from water, methanol or ethyl acetate to obtain highly purified amino acid higher alkyl ester hydrochloride or N-lower alkyl derivative thereof (hereinafter, referred to as amino acid higher alkyl ester salt, inclusive of both products) in 50 – 70% yield. In order to obtain other salts, the amino acid higher alkyl ester hydrochloride is dissolved in an equivalent amount of alkaline aqueous solution and extracted with benzene, and then a mineral acid (e.g., sulfuric acid) or organic acid (e.g., acetic acid, acidic amino acid, pyroglutamic acid, p-toluenesulfonic acid and the like) is added directly or in the form of solution dissolved in a suitable solvent to benzene-extracted layer, whereupon the corresponding salt is formed. The solubility of the amino acid higher alkyl ester salts obtained thus varies depending on the kind of salts and the length of carbon chain of the ester radical, but in general these salts are soluble in water. Free amino acid higher alkyl esters may be obtained by neutralizing their salts, e.g., the hydrochlorides with alkaline aqueous solution.

For the preparation of amino acid higher alkyl ester salts, various kinds of amino acids such as α-amino acid, β-amino acid and ω-amino acid may be employed. Examples of suitable amino acid include neutral amino acids such as glycine, phenylglycine, alanine, α-alanine, β-aminobutyric acid, valine, norvaline, leucine, isoleucine, norleucine, phenylalanine, p-nitrophenylalanine, tryptophane, proline and ε-aminocapric acid; acidic amino acids such as glutamic acid, aminomaloic acid, α-aminoadipic acid, α-aminopimeric acid, cysteic acid and homocysteic acid; basic amino acids such as lysine, ornithine, arginine and histidine. Other examples of the neutral, acidic, and basic amino acids are sulfur-containing amino acids such as methionine, cysteine, cystine, homocystine, β-thiolleucine and ethionine; hydroxyamino acids such as threonine, serine, β-hydroxyleucine, homoserine, oxyproline, dopa, tyrosine, nitrotyrosine and β-hydroxyglutamic acid; in addition, diaminodicarboxylic acids such as α,α'-diaminocitric acid, α,α'-diaminoglutaric acid and α,α'-diaminoadipic acid; N-methyl or N-ethyl derivatives of these amino acids such as N,N'-dimethylalanine, N,N'-dimethylphenylalanine and the like.

These amino acids may be optically active L- or D-form or racemic form. As higher alcohols for esterification, natural or synthetic aliphatic alcohols having 8 to 22 carbon atoms are employed, but lauryl alcohol, myristyl alcohol, cetyl alcohol, stearyl alcohol and the like are especially preferred. The amino acid alkyl ester salts wherein alkyl groups have less than 7 carbon atoms have weak fungicidal activity while amino acid alkyl ester salts wherein alkyl groups have more than 23 carbon atoms have very little water solubility owing to their long hydrophobic radicals.

As amino acid higher alkyl ester salts, any of salts with mineral acids or organic acids is effective, but especially salts with a mineral acid such as hydrochloric acid, sulfuric acid or nitric acid, acetic acid, oxalic acid, formic acid, butyric acid, lactic acid, p-toluenesulfonic acid, acidic amino acid and pyroglutamic acid are preferable. Among these amino acid ester salts, $C_{12}$ – $C_{18}$ alkyl ester pyroglutamate of the amino acids selected from the group consisting of glycine, alanine, valine, lysine, ornithine and phenylalanine are most suitable, since they are easily soluble in water and exhibit excellent effect in controlling plant diseases.

The outstanding feature of the active ingredients of the fungicidal and bactericidal compositions of the present invention is that although they do not show so appreciable fungicidal or bactericidal activity against plant disease fungi or bacteria in in vitro test, they exert noticeable preventive effect when applied to plants in in vivo test and they have no phytotoxic effect on the plants and show rather plant growth promoting action.

The active ingredients of the present invention are especially useful in controlling the following susceptible fungi (and bacteria) which attack food crops: *Piricularia oryzae*, the causative organism of rice blast; *Xantomonas oryzae*, the causature organism of rice leaf blight; *citrus melanose*; *Colletotrichum lagenarium*, the causative organism of cucumber anthracnose; *Phytophthora parasitica*, the causative organism of cucumber phytophthora rot; *Sphaerotheca fuliginea*, the causative organism of cucumber powdery mildew; *Pseudoperonospore cubensis*, the causative organism of the cucumber downy mildew; *Cladosporium fulvum*, the causative organism of tomato leaf mold; *Phytophthora fulvum*, the causative organism of tomato late blight; *Stemphylium lycopersici*, the causative organism of tomato leaf spot and others.

The active ingredients of the fungicides and bactericides in the present invention may be directly applied to the susceptible plant surfaces or they may be applied thereto in any formulation such as granules, dusts, emulsifiable concentrates, wettable powders, pastes, oil agents, aerosols, fogs or fumigants with suitable solid carriers, liquid carriers, emulsifying and dispersing agents and so on, like the usual formulation well-known in the art. Examples of these carriers include clay, kaoline, bentonite, acidic terra alba, diatomaceous earth, calcium carbonate, nitrocellulose, starch, acacia, carbon dioxide gas, Freon and the like. Also, there may be adequately compounded auxiliary agents, which are usually employed for formulation, e.g., surface active agents which serve as spreader, dispersing and emulsifying agents. Examples of such surface active agents are soap, higher alcohol sulfate, alkyl sulfonate, alkylaryl sulfonate, quaternary ammonium salt, polyalkylene oxide and the like. The preferred concentration of the active ingredient in the fungicidal composition is about 5 – 95% by weight for use as emulsifiable concentrates or wettable powders, while that is about 0.1 – 50% by weight for use as dusts or oil agents. However, these concentrations may be adequately varied depending on the purpose of use.

The amount of the fungicidal and bactericidal composition to be applied may vary according to such factors as the formulation of the composition, the type of the active ingredient, or the concentration of the active ingredient in the composition. Usually, it is about 10 g/10 ares to 2,000 g/10 ares, preferably 50 g/10 ares to 1,000 g/10 ares, as the active ingredient. If desired, greater amounts can be applied.

The active ingredients of this invention may also be employed in admixture with herbicides, insecticides, other fungicides, bactericides, soil conditioners and fertilizers such as urea, ammonium sulfate, ammonium phosphates, or potassium salts.

The following examples illustrate the production of various formulations for application of the fungicidal composition according to this invention. Parts are given therein as parts by weight.

EXAMPLE 1

Twenty parts of glycine laurylester.DL-pyroglutamate, 2 parts of sodium lignin sulfonate, 4 parts of polyoxyethylene alkyl ether and 72 parts of clay were mixed together and milled to obtain 100 parts of wettable powder.

EXAMPLE 2

Two parts of L-phenylalanine myristyl ester.DL-pyroglutamate and 98 parts of talcum were mixed to obtain 100 parts of dust.

EXAMPLE 3

Twenty parts of L-lysine cetylester hydrochloride, 10 parts of a mixture of polyoxyethylene alkyl allyl ether and sodium alkylaryl sulfonate, 20 parts of methanol and 50 parts of water were mixed until a suspension was formed. There was obtained 100 parts of emulsifiable concentrate.

EXAMPLE 4

Ten parts of DL-valine laurylester hydrochloride, 15 parts of starch, 72 parts of bentonite and 3 parts of sodium lauryl alcohol sulfate were mixed together and milled to obtain 100 parts of granule.

The evaluation of the effectiveness of the fungicidal and bactericidal compositions of this invention against numerous plant disease fungi was accomplished by the following experimental examples.

Experimental example 1: inhibitory test against rice blast disease (in pot test)

Rice stubbles (variety "Jukkoku") were planted in synthetic resin pots of 6 cm in diameter, 10 rice stubbles being planted per pot and were grown in the greenhouse. Various wettable powders prepared according to Example 1 were diluted with water to 500 ppm as the final concentration of test compound and each of the dilute aqueous solutions was applied to the rice plant seedlings of the four-leaf stage at a rate of 50 ml per pot using a spray-gun, and allowed to dry.

Spores of rice blast (*Piricularia oryzae*) which has been cultivated in a chaff medium containing yeast extract, soluble starch, saccharose and chaff were suspended in water, and sprayed inoculation on the rice plant seedlings uniformly. The rice plant seedlings treated thus were placed in an inoculation box at 28°C and relative humidity of above 95% to be infected with *Piricularia oryzae*. Two days after infection, the number of disease lesions per leaf was counted and the preventive value was calculated according to the following equation:

$$\text{Preventive value } (\%) = \left(1 - \frac{\text{number of disease lesions of treated leaf}}{\text{number of disease lesions of untreated leaf}}\right) \times 100$$

The results obtained were as shown in Table 1.

Table 1

| No. of test compound | Average Number of disease lesions per leaf | Preventive Value (%) | Phytotoxicity |
| --- | --- | --- | --- |
| 1 | 15.2 | 54 | — |
| 2 | 12.9 | 61 | — |
| 3 | 8.6 | 74 | — |
| 4 | 11.9 | 64 | — |
| 5 | 13.5 | 59 | — |
| 6 | 7.6 | 77 | — |
| 7 | 10.9 | 67 | — |
| 8 | 13.5 | 59 | — |
| 9 | 9.9 | 70 | — |
| 10 | 13.0 | 61 | — |
| 11 | 7.6 | 77 | — |
| 12 | 12.0 | 64 | — |
| 13 | 8.6 | 74 | — |
| 14 | 13.5 | 59 | — |
| "Kitazin-P" | 6.9 | 79 | — |
| Untreated plant | 33.0 | 0 | |

(Note)
Test compounds
No. 1 : glycine laurylester.DL.-pyroglutamate
No. 2 : DL.-alanine laurylester hydrochloride
No. 3 : β-alanine laurylester hydrochloride
No. 4 : DL.-valine laurylester hydrochloride Table 1-Continued

| No. of test compound | Average Number of disease lesions per leaf | Preventive Value (%) | Phytotoxicity |
|---|---|---|---|
| No. 5 : L-phenyl alanine laurylester hydrochloride | | | |
| No. 6 : N,N-dimethyl laurylester hydrochloride | | | |
| No. 7 : L-phenylalanine myristylester.DL-pyroglutamate | | | |
| No. 8 : β-alanine cetylester.DL-pyroglutamate | | | |
| No. 9 : L-lysine cetylester.DL-pyroglutamate | | | |
| No. 10 : DL-analine steraryl ester | | | |
| No. 11 : DL-glutamic acid-γ-lauryl ester | | | |
| No. 12 : DL-alanine lauryl ester acetate | | | |
| No. 13 : 2-aminoisobutyric acid lauryl ester hydrochloride | | | |
| No. 14 : DL-isoleucine myristyl ester.DL-pyroglutamate | | | |

Control fungicide "Kitazin-P" (trade name, product of Kumiai Chemical Industrial Co., Ltd. emulsifiable concentrate containing S-benzyl O,O'-diisopropyl phosphorothiolate) was sprayed at 500 ppm.: no phytotoxicity was recognized.

Experimental example 2 : inhibitory test against rice leaf blight

On the rice plant seedlings of the four – five - leaf stage grown in the greenhouse similarly to Experimental Example 1, was sprayed each of the dilute aqueous solutions (concentration of test compound : 500 ppm) of various wettable powders prepared according to Example 1 at a rate of 50 ml per pot and then allowed to dry.

Cells of bacterial leaf blight (*Xantomonas oryzae*) cultivated in a bacterial leaf blight culture medium at 27°C for 3 days were suspended in water and inoculated with needle to the highest and second high leaves of the rice plant. In 2 to 3 weeks after inoculation, these leaves were infected with Xantomonas oryzae and the length of disease lesion per stalk was measured for the evaluation of effectiveness. The preventive value was calculated according to the following equation :

$$\text{Preventive value } (\%) = (1 - \frac{\text{length of disease lesion of treated leaf}}{\text{length of disease lesion of untreated leaf}}) \times 100$$

The obtained results were as shown in Table 2.

Table 2

| No. of test compound | length of disease lesion per stalk (mm) | Preventive value (%) | Phytotoxicity |
|---|---|---|---|
| 1 | 27.0 | 64 | — |
| 2 | 21.0 | 72 | — |
| 3 | 12.8 | 83 | — |
| 4 | 7.5 | 90 | — |
| 5 | 32.3 | 57 | — |
| 6 | 30.0 | 60 | — |
| 7 | 24.0 | 68 | — |
| 8 | 27.8 | 63 | — |
| 9 | 15.8 | 79 | — |
| 10 | 19.5 | 74 | — |
| 11 | 24.0 | 68 | — |
| 12 | 16.5 | 78 | — |
| 13 | 23.3 | 69 | — |
| 14 | 26.2 | 65 | — |
| "Kumiai Phenazine" | 15.2 | 80 | — |
| "Mikasa Sunkel" | 26.2 | 65 | — |
| Untreated plant | 75 | 0 | |

(Note)
Nos. of test compounds used are the same with those of test compounds in table 1.

"Kumiai Phenazine" (trade name, product of Kumiai Chemical Industrial Co., Ltd., wettable powder containing phenazine 5-oxide) was sprayed at 62 ppm.

"Mikasa Sunkel" (trade name, product of Mikasa Chemical Industrial Co., Ltd., wettable powder containing nickel dimethyldithiocarbamate) was sprayed at 1,500 ppm.

Experimental example 3 : inhibitory test against Citrus melanose a. Test plant : shoots of about 3 years grown seedlings of citrus "Onshu" (2 – 4 trees planted in about 20 cm claypot)

b. Solution used for test

Each of various wettable powders prepared according to Example 1 was diluted with water to 500 ppm as the final concentration of test compound and then sprayed uniformly on the test plants at a rate of 40 ml per two claypots.

As control fungicide, "Daisen" [trade name, product of Nihon-Nohyaku Co., Ltd., wettable powder containing zinc ethylene bis-(dithiocarbamate)] was sprayed at 1,000 ppm.

c. Inoculum and the method of inoculation

In order to prepare a suspension of pycnospores, distilled and sterilized water was poured on the culture twigs with citrus melanose in a test tube. The suspension containing about 200 of pycnospores was prepared under the observation of microscope of 150 magnifications and then sprayed inoculation on the test plants treated as above. After inoculation, the test plants were placed in the inoculation box at 27°C and relative humidity of above 95% for about 3 days. Then, they were transferred into the greenhouse.

d. The method of inspection

About 2 – 3 weeks after inoculation, entire leaves of shoots were inspected for the development of disease and the state of infection was evaluated on a scale of 0 to 3 as follows :

0 : no disease
1 : 1 – 50 of disease spots
2 : 51 – 150 of disease spots
3 : above 151 of disease spots The extent of infection and the preventive value were calculated according to the following equations (I) and (II), respectively.

$$(I) \text{ Extent of infection} = \frac{1 \times n_1 + 2 \times n_2 + 3 \times n_3}{3 \times N} \times 100$$

wherein $n_1$, $n_2$ and $n_3$ are number of leaves inspected to be the states of infection 1, 2 and 3, respectively and N is the total number of leaves.

$$(II) \text{ Preventive value } (\%) = (1 - \frac{\text{extent of infection of treated leaves}}{\text{extent of infection of untreated leaves}}) \times 100$$

c. The results obtained were as shown in Table 3.

Table 3

| No. of test compound | Extent of infection (%) | Preventive value (%) | Phytotoxicity |
|---|---|---|---|
| 1 | 13 | 75 | — |
| 2 | 26 | 51 | — |
| 3 | 11 | 79 | — |
| 5 | 18 | 66 | — |
| 7 | 20 | 62 | — |
| 9 | 18 | 66 | — |
| 11 | 16 | 70 | — |
| 13 | 14 | 74 | — |
| "Daisen" | 20 | 62 | — |
| Untreated plant | 53 | 0 | — |

(Note)
Nos. of test compounds used are the same with those of test compounds in table 1.

Experimental example 4 : inhibitory test against cucumber downy mildew

Cucumber seeds (variety "Shinhikari No. A") were planted in seed-beds at the beginning of October, three cucumber seeds being planted per seed-bed, and they were grown in a greenhouse made of vinyl resin. This experiment was performed as three-repeated cultivation.

Each of various wettable powders prepared according to Example 1 was diluted with water to 500 ppm as the final concentration of test compound and sprayed on the cucumber seedlings using a shouldering-sprayer four times in total on the 30th of April, the 6th, 12th and 19th of May so as to wet both sides of leaves thoroughly with the liquid dispersion each time. The test plants treated thus were left to spontaneous infection. On the 23rd of May, the state of infection was inspected with respect to both sides of ten leaves ranging from 11th to 20th leaf, and the preventive value was calculated according to the following equation :

Preventive value (%) =
$$(1 - \frac{\text{number of leaves in treated plant}}{\text{number of leaves infected in untreated plant}}) \times 100$$

The results obtained were as shown in Table 4.

Table 4

| No. of test compound | Number of leaves infected (outside) | Preventive value (%) | Number of infected (inside) | Preventive value (%) | Phytotoxicity |
|---|---|---|---|---|---|
| 1 | 7 | 42 | 11 | 50 | — |
| 2 | 3 | 75 | 7 | 68 | — |
| 4 | 4 | 67 | 8 | 64 | — |
| 6 | 4 | 67 | 7 | 68 | — |
| 8 | 6 | 50 | 8 | 64 | — |
| 9 | 5 | 58 | 6 | 73 | — |
| 10 | 6 | 58 | 8 | 64 | — |
| 14 | 3 | 75 | 7 | 68 | — |
| "Daconil" | 6 | 50 | 12 | 45 | — |
| Untreated plant | 12 | 0 | 22 | 0 | — |

(Note)
Nos. of test compounds used are the same with those of test compounds in table 1.
"Daconil" (trademark of Diamond Shamrock Corporation, wettable powder containing tetrachloroisophthalonitrile) was sprayed at 1,250 ppm.

It will be understood from the results of inhibitory and phytotoxic tests that the active ingredients of the present invention exhibit satisfactory effect in controlling numerous plant diseases and have no phytotoxicity.

What we claim is:

1. A method of combatting bacteria or fungi on plants which comprises applying to said plants a bactericidally or fungicidally effective amount of a salt of $C_{12}$–$C_{18}$ alkyl ester of DL- or β-alanine, said salt being selected from the group consisting of hydrochloric acid, sulfuric acid, nitric acid, acetic acid, oxalic acid, formic acid, butyric acid, lactic acid, p-toluenesulfonic acid and pyroglutamic acid.

2. The method set forth in claim 1, wherein the salt is a hydrochloric acid salt of lauryl or cetyl ester of DL- or β-alanine.

3. The method set forth in claim 1, wherein the salt is a member selected from the group consisting of hydrochloric acid salt of DL-alanine lauryl ester, acetic acid salt of DL-alanine lauryl ester, hydrochloric acid salt of β-alanine lauryl ester and pyroglutamic acid salt of β-alanine cetyl ester.

4. The method set forth in claim 1, wherein said salt is applied in an amount of 10 g/10 ares to 2,000 g/10 ares.

5. The method set forth in claim 1, wherein said salt is applied in the form of an emulsifiable concentrate or wettable powder having the concentration of about 5 – 95% by weight.

6. The method set forth in claim 1, wherein said salt is applied in the form of dusts or oil composition having the concentration of about 0.1 – 50% by weight.

7. The method set forth in claim 1, wherein the salt is a acetic acid salt of lauryl of cetyl ester of DL- or β-alanine.

8. The method set forth in claim 1, wherein the salt is a pyroglutamic acid salt of lauryl or cetyl ester of DL- or β-alanine.

* * * * *

UNITED STATES PATENT AND TRADEMARK OFFICE
CERTIFICATE OF CORRECTION

PATENT NO. : 3,899,585
DATED : August 12, 1975
INVENTOR(S) : MISATO, ET AL.

It is certified that error appears in the above-identified patent and that said Letters Patent are hereby corrected as shown below:

Item 73, delete the Assignee data in its entirety and insert the following therefor:

-- Rikagaku Kenkyusho, Saitama-ken; and Ajinomoto Co., Ltd., Tokyo; both of Japan. --

Signed and Sealed this twelfth Day of July 1977

[SEAL]

Attest:

RUTH C. MASON
Attesting Officer

C. MARSHALL DANN
Commissioner of Patents and Trademarks